United States Patent Office 3,732,211
Patented May 8, 1973

3,732,211
1-ACYLOXYETHER-1,4-BENZODIAZEPIN-2-ONES AND METHODS FOR THEIR PREPARATION
Joseph Hellerbach, Basel, Switzerland, and Armin Walser, West Caldwell, N.J., assignors to Hoffmann-La Roche Inc., Nutley, N.J.
No Drawing. Filed July 9, 1971, Ser. No. 162,026
Claims priority, application Switzerland, July 29, 1970, 11,438/70
Int. Cl. C07d 53/06
U.S. Cl. 260—239.3 D
16 Claims

ABSTRACT OF THE DISCLOSURE 1-substituted - 1,4 - benozdiazepin-2-ones, derivatives thereof, and processes for the preparation of same are described. These compounds are useful as anti-convulsant, muscle relaxant and sedative agents.

DESCRIPTION OF THE INVENTION

The present invention relates to novel chemical compounds and to processes for the preparation thereof, said compounds having valuable therapeutic properties. More particularly, the present invention is directed to new benzodiazepine derivatives of the general formula

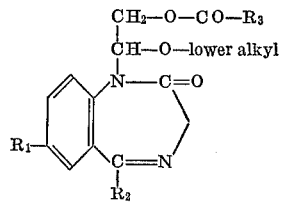

I and of the general formula

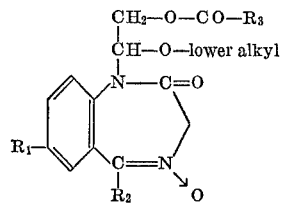

II wherein $R_1$ signifies halogen or nitro; $R_2$ signifies phenyl, halophenyl, or pyridyl; $R_3$ signifies halo-lower alkyl, lower alkoxy-lower alkyl, carboxy-lower alkyl, mono-lower alkylamino, di-lower alkylamino, a 5- or 6-membered aromatic heterocyclic ring containing one or two hetero atoms which may be substituted with one or two lower alkyl groups, or the group

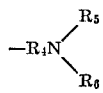

in which $R_4$ signifies a lower alkylene group and $R_5$ and $R_6$ individually represent hydrogen or lower alkyl or $R_5$ and $R_6$ taken together with their attached nitrogen atom form a 5- or 6-membered saturated heterocyclic ring which may contain an oxygen atom and the pharmaceutically acceptable acid addition salts thereof.

As used herein, either alone or in combination, the term "lower alkyl" comprehends straight or branched chain hydrocarbon groups having from 1 to 7 carbon atoms, preferably from 1 to 4 carbon atoms, such as methyl, ethyl, propyl, isopropyl and the like. The term "halogen" represents all four forms thereof, i.e., fluorine, chlorine, bromine and iodine unless expressly indicated otherwise. The term "halo-lower alkyl" includes mono-halo-lower alkyl, such as chloromethyl, di-halo-lower alkyl. The term "lower alkoxy" designates straight or branched chain saturated hydrocarbonoxy groups containing from 1 to 7 carbon atoms, preferably from 1 to 4 carbon atoms, such as methoxy, ethoxy, propoxy and the like. The term "carboxy-lower alkyl" encompasses such groups as, for example, ω-carboxy-lower alkyl groups like 2-carboxyethyl. The term "mono-lower alkylamino" includes groups such as methylamino, ethylamino, and the like. Examples of the

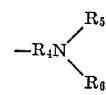

groupings, wherein $R_4$–$R_6$ are as described above, used to define the $R_3$ substituent include an amino-lower alkyl group such as aminoethyl, a di-lower alkyl-amino-lower alkyl group such as diethylaminoethyl, or a lower alkyl group substituted by a 1-pyrrolidinyl, piperidino or morpholino group.

When the $R_3$ substituent represents a 5- or 6-membered substituted or unsubstituted aromatic heterocyclic ring contaiinng one or two hetero atoms, the hetero atoms are preferably nitrogen, oxygen or sulfur atoms or the combination of any two thereof. Thus, the heterocyclic ring system may contain one or two nitrogen atoms; or one oxygen or sulfur atom; or one oxygen or sulfur atom and one nitrogen atom. Representative aromatic heterocyclic ring systems include furan, thiophene, oxazole, isoxazole, pyrazole, pyridine or pyridazine, which may be substituted by one or two lower alkyl groups. Preferred heterocycles include the 2-furyl group, the 4-methyl-5-oxazolyl group, the 5-methyl-3-isoxazolyl group, the 1,5-dimethyl-3-pyrazolyl group, the 2-, 3-, or 4-pyridyl group and the 2-thienyl group.

Preferred among the compounds of Formulae I and II are those wherein the $R_1$ substituent is chlorine or nitro. When the $R_2$ substituent is a halophenyl group, the halo substituent is preferably present in the 2-position of the phenyl ring. When the $R_2$ substituent is a pyridyl group, the 2-pyridyl group is preferred.

A preferred class of compounds falling within the scope of Formulae I and II are those wherein $R_1$ signifies chlorine or nitro, and $R_2$ signifies phenyl or mono-halo phenyl with the halogen atom preferably being chlorine or fluorine and positioned in the 2-position of the phenyl ring, i.e. compounds of the formula

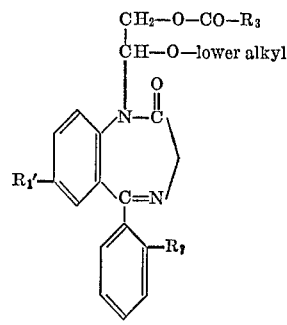

Ia and

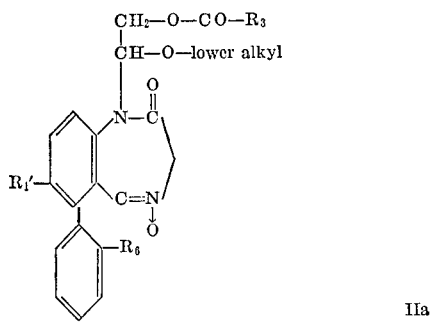

IIa wherein $R_1'$ signifies chlorine or nitro, $R_7$ signifies hydrogen or halogen, preferably chlorine or fluorine, and $R_3$ is as described above.

Another preferred class of compounds falling within the scope of Formulae I and II are those wherein the $R_3$ substituent is a halo-lower alkyl group, especially a halomethyl group such as chloromethyl, a carboxy-lower alkyl group such as 2-carboxyethyl, a lower alkoxy-lower alkyl group such as methoxymethyl or a lower alkyl amino group such as methylamino or ethylamino. A further preferred group of compounds within the scope of the present invention are those wherein the $R_3$ substituent is an aromatic heterocyclic ring, most preferably a pyridyl ring, especially 2- or 3-pyridyl, or a pyrazinyl ring, especially 2-pyrazinyl.

Most preferred of the compounds of Formula I are:

2-(7-chloro-2,3-dihydro-2-oxo-5-phenyl-1H-1,4-benzodiazepin-1-yl)-2-methoxyehyl picolinate;
2-(7-chloro-2,3-dihydro-2-oxo-5-phenyl-1H-1,4-benzodiazepin-yl-)-2-methoxyethyl pyrazine-2-carboxylate;
2-(7-chloro-2,3-dihydro-2-oxo-5-phenyl-1H-1,4-benzodiazepin-1-yl)-2-methoxyethyl chloroacetate;
2-(7-chloro-2,3-dihydro-2-oxo-5-phenyl-1H-1,4-benzodiazepin-1-yl)-2-methoxyethyl hydrogen succinate;
2-(7-(chloro-2,3-dihydro-2-oxo-2-phenyl-1H-1,4-benzodiazepin-1-yl)-2-methoxyethyl methoxyacetate;
2-(7-chloro-2,3-dihydro-2-oxo-5-phenyl-1H-1,4-benzodiazepin-l-yl)-2-methoxyethyl ethylcarbamate;
2-(7-chloro-2,3-dihydro-2-oxo-5-phenyl-1H-1,4-benzodiazepin-1-yl)-2-methoxyethyl methylcarbamate; and
2-(7-chloro-2,3-dihydro-2-oxo-5-phenyl-1H-1,4-benzodiazepin-1-yl)-2-methoxyethyl nicotinate.

The novel compounds of the present invention can be prepared following a variety of synthetc routes.

(A) In one such process aspect, a compound of Formula I or II can be prepared by reacting a compound of the formula

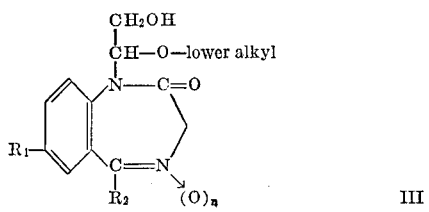

III wherein $R_1$ and $R_2$ are as described above and $n$ is 0 or 1 with an acylating agent to convert the primary hydroxy group into a —$OCOR_3$ group.

If it is desired to prepare a compound of Formula I or II in which the $R_3$ substituent is a mono-lower alkylamino group following process aspect (A), a compound of Formula III is reacted with an isocyanate of the general formula $$O=C=N\text{—lower alkyl} \qquad (IV)$$

Examples of isocyanates of Formula IV are methyl isocyanate, ethyl isocyanate and the like.

The compounds of Formula I or II wherein $R_3$ is other than mono-lower alkylamino can be prepared by reacting a compound of Formula III above with a reactive derivative of a carboxylic acid of the general formula $$HOOC\text{—}R_8 \qquad (V)$$

wherein $R_8$ signifies halo-lower alkyl, lower alkoxy-lower alkyl, carboxyl-lower alkyl, di-lower alkylamino, the group

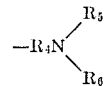

wherein $R_4$–$R_6$ are as described above, or a 5- or 6-membered saturated heterocyclic ring containing one or two hetero atoms which may be substituted with one or two lower alkyl groups.

If the $R_8$ substituent contains a primary or secondary amino group, this can carry a protecting group (e.g. a formyl group) which is removed following conventional techniques after the acylation.

Representative reactive derivatives of a carboxylic acid of Formula V for the acylation of a compound of Formula III include, for example, anhydrides (e.g. succinic acid anhydride, chloroacetic acid anhydride and the like), acid halides (e.g. dichloroacetyl chloride, furan-2-carboxylic acid chloride, 5 - methyl-isoxazole-3-carboxylic acid chloride, isonicotinoyl chloride hydrochloride, nicotinoyl chloride and the like), imdazoldes (e.g. picolinic acid imidazolide, pyrazine-2-carboxylic acid imidazolide, methoxyacetic acid imidazolde, 4-methyl-oxazole-5-carboxylc acid imidazolide, 1,5-dimethyl-pyrazole-3-carboxylic acid imidazolide, nicotinic acid imidazolide and the like) or other derivatives suitable as acylating agents.

The reaction conditions for the reaction between a compound of Formula III and an isocyanate of Formula IV or a compound of Formula V are not critical and can be readily be selected by one skilled in the art depending on the reactive derivatives of the carboxylic acid or isocyanate selected as the acylating agent. For example, the reaction can be carried out at room temperature or at a temperature above or below room temperature, depending in each case on the reagent selected. In addition, the reaction is expediently carried out in an inert organic solvent such as a hydrocarbon (e.g. benzene, toluene and the like), a chlorinated hydrocarbon (e.g. methylene chloride and the like), an ether (e.g. tetrahydrofuran and the like), dimethylformamide, pyridine and the like.

The compounds of Formula III used as the starting materials in this process aspect can be prepared by replacing the aliphatically-bound halogen atom in the side-chain of a compound of the formula

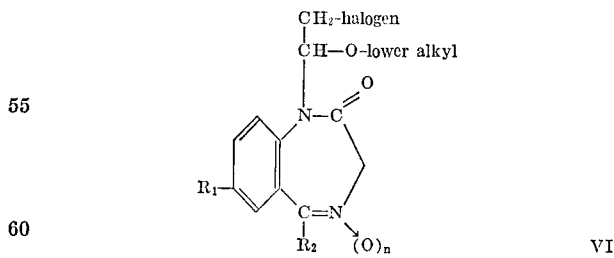

VI wherein $R_1$, $R_2$ and $n$ are as described above by a hydroxy group. This can, for example, be effected by first converting a compound of Formula VI into the corresponding acetate and thereupon hydrolyzing or alcoholyzing the acetate in the presence of catalytic amounts of a base. These two steps can also be carried out in a single operation. For example, a compound of Formula VI can be heated under anhydrous conditions with potassium acetate (e.g. in a mixture of toluene and dimethylformamide) to yield the corresponding acetoxy compound which can be subsequently hydrolyzed or alcoholyzed to the desired hydroxy compound of Formula III. On the other hand, if this reaction is conducted in the presence of water (e.g. in dimethylformamide/water in the proportion of about 20:1), under otherwise similar conditions the hydroxy compound of Formula III is obtained directly.

(B) In a further process aspect of the present invention, the aliphatically bound halogen atom in the side-chain of a compound of the formula

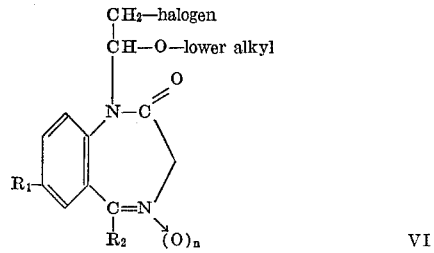
VI wherein $R_1$, $R_2$ and $n$ are as described above is replaced by a group of the formula

—O—CO—$R_3'$ (VII)

wherein $R_3'$ signifies halo-lower alkyl, lower alkoxy-lower alkyl, the group

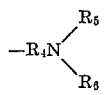

in which $R_4$–$R_6$ are as described above, or a 5- or 6-membered aromatic heterocyclic ring containing one or two hetero atoms which may be substituted with one or two lower alkyl groups to yield a compound of the formula

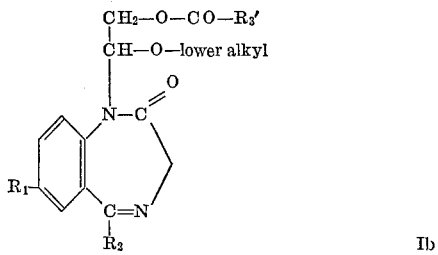
Ib or of the formula

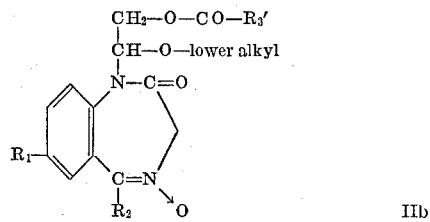
IIb wherein $R_1$, $R_2$, and $R_3'$ are as described above.

The replacement of the aliphatically-bound halogen atom in the side-chain of a compound of Formula VI by a group of Formula VII is expediently carried out by reaction with a suitable salt of a corresponding carboxylic acid of the general formula

HOOC—$R_3'$ (VIII)

wherein $R_3'$ is as described above.

If the $R_3'$ substituent in the compound of Formula VIII contains a primary or secondary amino group, this can carry a protecting group (e.g. a formyl group) which is removed by conventional means after reaction with a compound of Formula VI. Especially suitable salts are the silver, potassium or sodium salts as well as salts of suitable amines (e.g. trialkylamines such as triethylamine); as typical anions there may be mentioned, for example, the nicotinate, the thiophene-2-carboxylate and the formylglycinate anions. If amine salts are used, these can also be prepared in situ; for example, a compound of Formula VI is reacted with the corresponding acid in the presence of a suitable amine. It is expedient to carry out the reaction between compounds of Formulae VI and VIII above in the presence of an inert organic solvent, for example, in a hydrocarbon such as benzene, toluene and the like, in a ketone such as acetone, methyl ethyl ketone and the like, in dimethylformamide etc. Depending on the reagents selected, the reaction can be carried out at a temperature between room temperature and the reflux temperature of the reaction mixture.

The compounds of Formula VI used as the starting materials in this process aspect may be prepared by reacting a compound of the general formula

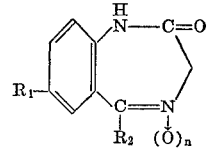
IX wherein $R_1$, $R_2$ and $n$ are as described above with a compound of the general formula

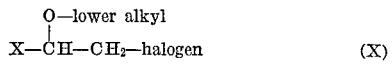
(X)

in which X signifies any suitable leaving group such as a halogen atom, an arylsulfonyloxy group or an alkyl sulfonyloxy group.

The reaction of a compound of Formula IX with a compound of Formula X, such as, for example, 1,2-dichloro-1-methoxyethane, can be carried out in the presence of an inert organic solvent such as a hydrocarbon (e.g. benzene, toluene and the like), dimethylformamide, an ether (e.g. dioxane or tetrahydrofuran), an alcohol (e.g. tert. butanol) and the like or in a mixture of such organic solvents. The reaction is suitably carried out at a temperature of, for example, between —50° C. and 120° C. Preferred leaving groups for the purposes of this process aspect include a halogen atom, especially chlorine, bromine or iodine, a mesyloxy group, a tosyloxy group, or a benzenesulfonyloxy group. It is expedient to first transform a compound of Formula IX into the corresponding 1-alkali metal derivative thereof before the reaction with a compound of Formula X. This 1-alkali metal derivative can, for example, be obtained by the reaction of the 1H compound of Formula IX with an alkali metal lower alcoholate such as sodium methylate, an alkali metal hydride such as sodium hydride, an alkali metal amide such as sodium amide and like agents. The reaction of a compound of Formula IX with a compound of Formula X can, however, also be carried out in the presence of a base such as an alkali hydroxide (e.g. sodium hydroxide) or triethylamine.

(C) In a further process aspect of the present invention, a compound of the formula

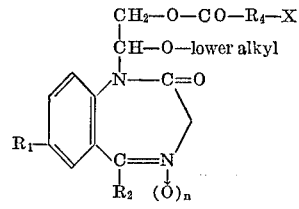
XI wherein $R_1$, $R_2$, $R_4$, X and $n$ are as described above is reacted with an amine of the general formula

XII wherein $R_5$ and $R_6$ are as described above to yield a compound of Formula I or II wherein the $R_3$ substituent is the group

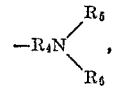

$R_4$–$R_6$ being defined as above.

The reaction of a compound of Formula XI with an amine of Formula XII is expediently carried out in the presence of an inert organic solvent, for example, in a hydrocarbon such as benzene, toluene and the like, in a chlorinated hydrocarbon such as methylene chloride and the like, in dimethylformamide etc. Depending on the nature of the compound of Formula XI and the amine of Formula XII employed, the reaction can be carried out at a temperature between room temperature and the reflux temperature of the solvent.

The compounds of Formula XI used as starting materials for this process aspect can be prepared by acylating a compound of Formula III above with a reactive derivative of a carboxylic acid of the general formula

HOOC—R₄—X    (XIII)

wherein R₄ and X are as described above.

This acylation is effected following the procedures described earlier for the reaction of a compound of Formula III with a reactive derivative of a carboxylic acid of Formula V.

(D) In a further process aspect of the present invention, a compound of Formula I above may be prepared by cyclizing a compound of the general formula

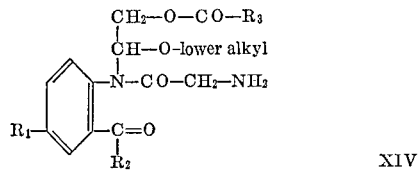

XIV wherein R₁–R₃ are as described above.

The cyclization of a compound of Formula XIV can be carried out in an alkaline, neutral or acidic medium and in any suitable inert organic solvent such as hydrocarbon, a chlorinated hydrocarbon, an ether, glacial acetic acid, an alcohol, dimethylformamide and the like. Temperature and pressure are not critical factors, but it is expedient to carry out the cyclization at a temperature in a range of from about 0–150° C.

The amine intermediate of Formula XIV is preferably not isolated from the reaction mixture in which it is prepared but can be cyclized in situ under the reaction conditions employed to pass directly to the desired compound of Formula I.

The compounds of Formula XIV used as the starting materials for the process aspect can be prepared by a variety of procedures. For example, a compound of the general formula

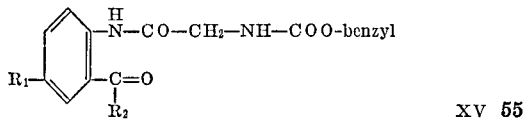

XV wherein R₁ and R₂ are as described above is reacted with a compound of Formula X above in an analogous manner to the procedure described earlier for the preparation of compounds of Formula VI to yield a compound of the formula

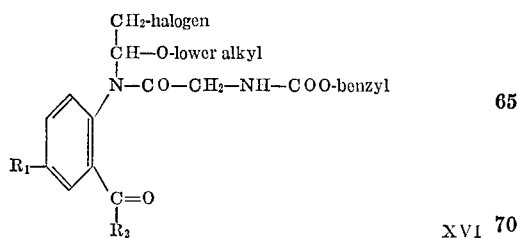

XVI wherein R₁ and R₂ are as described above.

The aliphatically-bound halogen atom in the resulting compound of Formula XVI is then replaced by a hydroxy group in an analogous procedure to that described for the preparation of a compound of Formula III to yield a compound of the formula

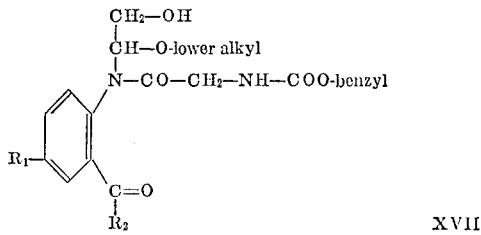

XVII wherein R₁ and R₂ are as described above.

The resulting compound of Formula XVII is then reacted with an isocyanate of Formula IV or a reactive derivative of a carboxylic acid of Formula V in an analogous manner to that described in process aspect (A) above. After the reaction of the Formula XVII compound with a compound of Formula IV or V above, the carbobenzoxy group can be split off following conventional techniques.

The aliphatically-bound halogen atom in a compound of Formula XVI can also be replaced by a group of the formula —O—CO—R₃′, R₃′ being as defined above, in an analogous manner to the procedure described earlier in process aspect (B) and the carbobenzoxy group can thereupon be cleaved off following conventional techniques. The compound of Formula XVII can also be acylated with a reactive derivative of a carboxylic acid of Formula XIII above in an analogous manner to that described in process aspect (C) above and the so-obtained compound of the formula

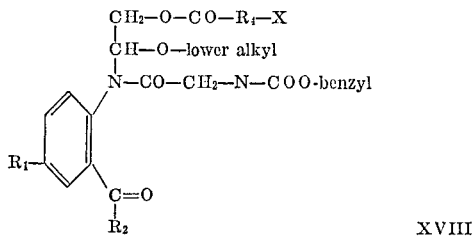

XVIII wherein R₁, R₂, R₄ and X are as described above reacted with an amine of Formula VIII, following the procedures set forth in process aspect (C). The carbobenzoxy group can then be cleaved off following conventional procedures.

In an alternate process aspect, a substituent of the general formula

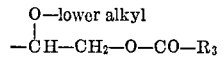

wherein R₃ is as described above can be introduced into a compound of the general formula

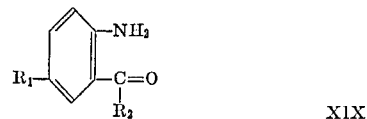

XIX wherein R₁ and R₂ are as described above. The carbobenzoxy glycyl group is then introduced into the product obtained and the carbobenzoxy group subsequently split off.

The splitting off of the carbobenzoxy group can, for example, be carried out by catalytic hydrogenation or by means of a hydrohalic acid in the presence of acetic acid. The catalytic hydrogenation can be effected in glacial acetic acid/HCl or ethanol/HCl and the like. The splitting off of the carbobenzoxy group using a hydrohalic acid in glacial acetic acid can be carried out in the presence of an inert organic solvent such as a chlorinated hydrocarbon (e.g. methylene chloride) and the like and at a temperature between —20° C. and room temperature.

(E) In a further process aspect of this invention, the compounds of Formula II above may be prepared by oxidizing the corresponding compounds of Formula I above.

The oxidation of a compound of Formula I to the corresponding compound of Formula II can be carried out using, for example, as the oxidizing agent an organic peracid such as peracetic acid, trifluoroperacetic acid, perbenzoic acid, m-chloroperbenzoic acid, perphthalic acid and the like. The temperature for this oxidation is not critical and can therefore vary within wide limits. It is expedient to carry out the oxidation in an inert organic solvent, for example, in a hologenated hydrocarbon such as methylene chloride, in an aromatic hydrocarbon such as benzene, in an ether such as diethyl ether and the like.

Alternatively, the compounds of Formula I above can be prepared by the deoxygenation of the corresponding compounds of Formula II. The deoxygenation of a compound of Formula II can, for example be carried out by hydrogenation in the presence of Raney-nickel, expediently in an inert organic solvent such as a hydrocarbon (e.g. benzene or toluene), an alcohol, an ether (e.g. dioxane), ethyl acetate and the like at room temperature and normal presure or elevated pressure. Another suitable method is treatment of the Formula II compound with a phosphorus trihalide such as phosphorus trichloride, expediently in an inert organic solvent such as a hydrocarbon (e.g. benzene and the like) or a chlorinated hydrocarbon and at room temperature, although temperatures above and below room temperature can likewise be employed. The deoxygenation can also be effected with zinc and glacial acetic acid in an organic solvent such as glacial acetic acid, a chlorinated hydrocarbon, an ether, an alcohol and the like and expediently at temperatures between about $-20°$ C. and $50°$ C. The choice of the preferred deoxygenating agent is largely governed by the functional groups present in the Formula II compound so as to avoid unfavorable side-reactions as far as possible. Thus, where a halo lower alkyl and/or a nitro group is present in the molecule, the deoxygenation is expediently carried out with a phosphorus trihalide.

(F) In another process aspect of the present invention, a compound of Formula I above can be prepared by dehydrating a compound of the general formula

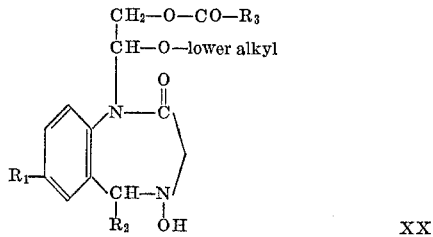

XX wherein $R_1$–$R_3$ are as described above.

The dehydration of a compound of Formula XX yields the corresponding compound of Formula I and can, for example, be carried out with a carbodiimide such as cyclohexylcarbodiimide and the like. The dehydration is expediently carried out in the presence of an inert organic solvent such as a hydrocarbon (e.g. benzene or toluene), an ether (e.g. dioxane) and the like.

The dehydration is suitably carried out at a temperature of, for example, between $-20°$ C. and $100°$ C. In this dehydration, there is frequently observed the formation of the corresponding isomeric 3,4-dehydro compound of the formula

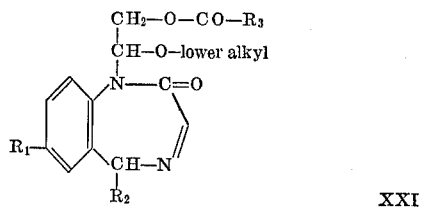

XXI wherein $R_1$–$R_3$ are as described above.

The isomeric compound of Formula XXI can be readily isomerized to the desired 4,5-dehydro compound. The rearrangement (i.e. isomerization) of a compound of Formula XXI can be carried out by treatment of said compound with a base such as an alkali alcoholate (e.g. sodium methoxide), an alkali hydride (e.g. sodium hydride), triethylamine and the like. The rearrangement is expediently carried out in an inert organic solvent such as a hydrocarbon, an ether, an alcohol and the like and at a temperature between $-40°$ C. and $120°$ C. The isomeric compounds of Formula XXI may also be prepared by introducing the desired substituent into the corresponding 1-unsubstituted compound following procedures described earlier. In this case, however, an isomerization to the 4,5-dehydro compound can simultaneously occur.

The compounds of Formual XX used as starting materials in this process aspect can be prepared by reducing a compound of Formula II with platinum oxide.

It is expedient to carry out this reduction in an organic solvent such as glacial acetic acid, an alcohol and the like and at a temperature between about $0°$ C. and $50°$ C., preferably at room temperature.

(G) In another process aspect, a compound of Formula I can be prepared by oxidizing or dehydrogenating a compound of the general formula

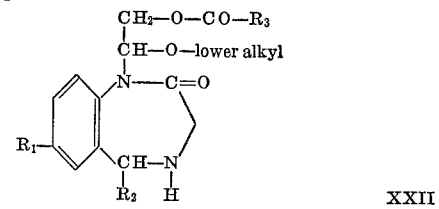

XXII wherein $R_1$–$R_3$ are as described above.

The oxidation of a compound of Formula XXII yields the corresponding compound of Formula I and can, for example, be carried out with bromine, chlorine, azodicarboxylic acid esters (e.g. the diethyl ester), halosuccinimides (e.g. bromosuccinimide), haloamides (e.g. chloroacetamide) and the like. It is expedient to carry out this reaction in the presence of an inert organic solvent such as a hydrocarbon (e.g. benzene, toluene and the like), a halogenated hydrocarbon (e.g. carbon tetrachloride), an ether (e.g. dioxane or tetrahydrofuran) and the like and advantageously at a temperature between about $-30°$ C. and $100°$ C.

The compounds of Formula XXII above used as the starting material in this process aspect can be prepared from compounds of the general formula

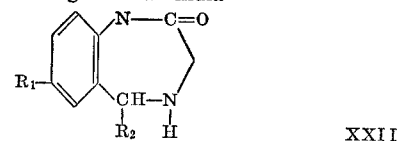

XXIII wherein $R_1$ and $R_2$ are as described above in an an analogous manner to the procedure described above for the preparation of Formula I compounds from compounds of Formula IX via the halo-substituted compound of Formula VI. However, before carrying out the acylation, a protecting group such as the carbobenzoxy group must be introduced at the 4-position and subsequently hydrogenolytically removed.

(H) In another process route, compounds of Formula I can be prepared by converting a compound of the general

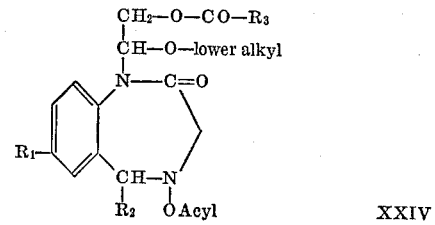

XXIV formula wherein $R_1$–$R_3$ are as described above into the corresponding 4,5-dehydro compound by treatment with a base.

This conversion, which results in the cleavage of acid from a compound of Formula XXIV, can be carried out by treatment with a base such as an alkali hydride (e.g. sodium hydride), triethylamine, an alkali amide (e.g. sodium amide), an alkali alkoxide (e.g. sodium methoxide) and the like in an anhydrous medium. In this case, it is expedient to carry out the treatment in an inert organic solvent such as an ether, alcohol (e.g. ethanol), a hydrocarbon (e.g. benzene or toluene), dimethylformamide and the like and at temperatures between —40° C. and 120° C. The acyl group in Formula XXIV can be a lower alkanoyl (e.g. acetyl), aroyl (e.g. benzoyl), tosyl or mesyl group. In this embodiment there can also occur as an intermediate the isomeric compound of Formula XXI which can be rearranged into the desired compound of Formula I as described in process aspect (F).

The compounds of Formula XXIV used as starting materials for this process aspect can be prepared by acylating a corresponding 4-hydroxy compound of Formula XX. Suitable acylating agents are, for example, acid anhydrides such as acetic acid anhydride, acid halides and the like. It is expedient to carry out the acylation in the presence of a base such as pyridine and the like as an acid-acceptor and in an organic solvent such as a hydrocarbon, a chlorinated hdyrocarbon, an ether and the like at a temperature between —50° C. and 100° C. If the side-chain carries an acylatable nitrogen atom, this must be protected prior to the acylation by a carbobenzoxy group or an equivalent protecting group; the carbobenzoxy group or other protecting group being subsequently removed by conventional means.

(I) In a further process aspect, a compound of Formula I above may be prepared by treating a compound of the general formula

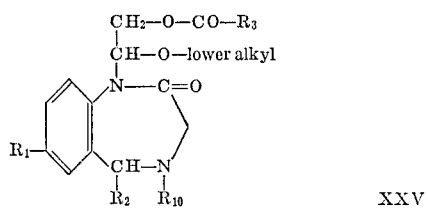

XXV wherein $R_1$–$R_3$ are as described above and $R_{10}$ signifies alkylsulfonyl or arylsulfonyl with a strong base.

The cleavage of an alkylsulphonyl (e.g. mesyl) or arylsulphonyl (e.g. tosyl) group from a compound of Formula XXV can be carried out by treatment with a strong base such as an alkali hydride (e.g. sodium hydride), an alkali alkoxide (e.g. sodium methoxide), an alkali amide (e.g. sodium amide) and the like in an anhydrous medium. In this case, it is expedient to carry out the treatment in an inert organic solvent such as an ether, an alcohol (e.g. ethanol), a hydrocarbon (e.g. benzene or toluene), dimethylformamide and the like and at a temperature between 0° C. and 120° C. In this treatment, there can also occur the isomeric compound of Formula XXI which can be reaarranged to the desired compounds of Formula I as described above.

The compounds of Formula XXV used as starting materials for this embodiment can be prepared by acylating a corresponding 4,5-dihydro compound of Formula XXII; for example, by means of a mesyl or tosyl halide. It is expedient to carry out this acylation in an inert organic solvent such as a hydrocarbon (e.g. benzene), a chlorinated hydrocarbon and the like and in the presence of an acid-acceptor such as pyridine and the like and at a temperature between 0° C. and the reflux temperature of the acylation mixture. If the side-chain in the compounds of Formula XXII carries an acylatable nitrogen atom, this must be temporarily protected before the acylation by a carbobenzoxy group or an equivalent protecting group.

It will be appreciated that the respective starting materials referred to hereinbefore need not be isolated in pure form, but can be used in the process of this invention without isolation from the medium in which they are prepared.

Compounds of Formulae I and II above which are basic in nature form acid addition salts with inorganic acids such as hydrochloric acid, phosphoric acid, hydrobromic acid, sulphuric acid and the like and with organic acids such as citric acid, acetic acid, formic acid, succinic acid, maleic acid, p-toluene-sulphonic aicd and the like.

Compounds of Formulae I and II above and their pharmaceutically acceptable acid addition salts are useful as anticonvulsants, muscle relaxants sedatives and anxiolytics.

The anticonvulsant activity is demonstrated when mice to which compounds of Formulae I and II or their salts have been administered are subjected to the pentamethylenetetrazole test according to the method of Orloff [Proc. Soc. Exptl. Biol. Med., 70, 254–257 (1949)]. The results are given as "APR 2.0" by which is meant that dosage (in mg./kg. p.o.) of an anticonvulsant which brings about double the pentamethylenetetrazole consumption in comparison to an untreated control group. For example, 2-(7-chloro-2,3-dihydro-2-oxo-5-phenyl-1H-1,4 - benzodiazepin-1-yl)-2-methoxyethyl nicotinate, which displays an $LD_{50}$ of 600–1200 mg./kg. (p.o.) shows an APR of 9 mg./kg. p.o., 2-(7-chloro-2,3-dihydro-2-oxo-5 - phenyl - 1H - 1,4-benzodiazepin-1-yl)-2-methoxyethyl chloroacetate ($LD_{50}$ 2500–500 mg./kg. p.o.) shows an APR 2.0 of 2.5 mg./kg. (p.o.) and 2-(7-chloro-2,3-dihydro-2oxo-5-phenyl-1H-1,4-benzodiazepin-1-yl)-2-methoxyethyl pyrazine-2 - carboxylate ($LD_{50}$ 1250–2500 mg./kg. p.o.) shows an APR 2.0 of 2.3 mg./kg. (p.o.).

The muscle relaxant activity can be demonstrated in the rotating rod test. This test measures the capability of mice under the influence of a compound having muscle relaxant or sedative activity to remain on a slowly rotating rod. The rod used has a diameter of 30 mm. and rotates at 2 revolutions per minute. For the test there are selected those mice which are able to remain on the rotating rod for at least 2 minutes prior to administration of the compound to be tested. Thereafter, the selected mice are given the compound to be tested in varying dosages, introduced onto the rotating rod 30 minutes later and the time during which they are able to remain on the rotating rod is determined. That dosage which brings about 50% reduction of the time spent on the rotating rod is denoted as the $HD_{50}$. For example, the aforementioned 2-(7-chloro-2,3-dihydro-2-oxo-5-phenyl-1H-1,4-benzodiazepin-1-yl)-2-methoxyethyl pyrazine-2-carboxylate showsa n $HD_{50}$ of 4 mg./kg. (p.o.).

The compounds of Formula I and their pharmaceutically acceptable salts can according be used as medicaments; for example, in the form of pharmaceutical preparations which contain them in admixture with a compatible pharmaceutical carrier. This carrier can be an organic or inorganic, inert carrier material which is suitable for enteral or parenteral application such as, for example, water, gelatin, lactose, starches, magnesium stearate, talc, vegetable oils, gums, polyalkylene glycols, petroleum jelly etc. The pharmaceutical preparations can be made up in solid form (e.g. as tablets, dragees, suppositories or capsules) or in liquid form (e.g. as solutions, suspensions or emulsions). They may be sterilized and/or may contain adjuvants such as preserving, stabilizing, wetting or emulsifying agents, salts for varying the osmotic pressure or buffers. They can also contain yet other therapeutically valuable substances. The dosage follows individual requirements, but a dosage of 0.1 mg./kg. to 10 mg./kg./day is preferred.

The following examples further illustrate the invention.

EXAMPLE 1

A stirred suspension of 10.3 g. of 7-chloro-1,3-dihydro-1-[(2-hydroxy-1-methoxy)ethyl]-5-phenyl-2H-1,4 - benzodiazepin-2-one in 100 ml. of benzene is treated at room temperature with 4.0 g. of succinic acid anhydride and 6.0 ml. of triethylamine to form a clear solution. The mixture is left to stand overnight, concentrated, the residue taken up in 100 ml. of 5% aqueous potassium carbonate solution, washed with ether, acidified with dilute acetic acid and the resulting oil extracted with methylene chloride. The extract is dried over sodium sulphate, concentrated and the residue is crystallized by triturating with hexane to yield 2-(7-chloro-2,3-dihydro-2-oxo-5-phenyl-1H-1,4-benzodiazepin-1-yl)-2-methoxyethyl hydrogen succinate of melting point 167–169° C.

The starting material may be prepared as follows:

A solution, cooled to −20° C. of 27.1 g. of 7-chloro-1,3-dihydro-5-phenyl-2H-1,4-benzodiazepin-2-one in 150 ml. of dimethylformamide is treated with 8.1 g. of sodium methoxide and stirred for 5 minutes. After cooling to −40° C., 19.5 g. of 1,2-dichloro-1-methoxyethylene are added dropwise. Within 30 minutes, the temperature is allowed to rise to 0° C., the mixture is poured with stirring onto 500 ml. of water, the precipitated material is separated off and taken up in methylene chloride. After drying over sodium sulphate, the methylene chloride solution is evaporated and the residue is crystallized from ether. Recrystallization from methanol gives 7-chloro-1-[(2-chloro-1-methoxy)ethyl]-1,3-dihydro-5-phenyl - 2H - 1,4-benzodiazepin-2-one, melting point 152°–154° C.

A solution of 36.3 g. of 7-chloro-1-[(2-chloro-1-methoxy)ethyl]-1,3 - dihydro-5-phenyl-2H-1,4-benzodiazepin-2-one in a mixture of 400 ml. of dimethylformamide and 20 ml. of water is treated with 16 g. of potassium acetate and boiled under reflux for 5 minutes. After cooling to 0° C., the mixture is poured onto 1600 ml. of water. The precipitated product is separated off and taken up in methylene chloride. The solution, after washing with water and drying over sodium sulphate, is evaporated and the residue crystallized from ether to yield 7-chloro-1,3-dihydro-1-[(2-hydroxy-1-methoxy)ethyl] - 5 - phenyl-2H-1,4-benzodiazepin-2-one, melting point 154°–156° C. A second crystal modification melts at 190°–192° C.

EXAMPLE 2

A stirred suspension of 10.3 g. of 7-chloro-1,3-dihydro-1-[(2-hydroxy-1-methoxy)ethyl] - 5 - phenyl - 2H - 1,4-benzodiazepin-2-one in 100 ml. of benzene is treated at room temperature with 5.7 g. of chloroacetic acid anhydride and 6.0 ml. of triethylamine and left to stand at the same temperature for 4 hours. The solution obtained is concentrated under reduced pressure, the oily residue taken up in methylene chloride and the solution obtained chromatographed on 300 g. of silica gel with 20% ethyl acetate in methylene chloride. The uniform fractions are combined, concentrated and recrystallized from ether and hexane to yield 2-(7-chloro-2,3-dihydro-2-oxo-5-phenyl-1H-1,4-benzodiazepin-1-yl)-2-methoxyethyl chloroacetate, melting point 124–126° C.

EXAMPLE 3

A solution of 3.7 g. of 2-(7-chloro-2,3-dihydro-2-oxo-5-phenyl-1H-1,4-benzodiazepin-1-yl)-2-methoxyethyl chloroacetate in 30 ml. of benzene is treated with 6.0 ml. of diethylamine and boiled under reflux for 2 hours. After cooling, the mixture is filtered and the filtrate evaporated in a vacuum. The oily residue is taken up on the methylene chloride, the solution washed with saturated aqueous sodium chloride solution and again evaporated. The residue, dissolved in 100 ml. of ether, is then treated with a slight excess of 3 N ethereal hydrogen chloride solution and left to stand overnight in a refrigerator. The crystalline precipitate is dissolved at room temperature in 70 ml. of isopropanol and, after the addition of 70 ml. of ether, left to stand in an ice-bath for 2 hours to yield N,N-diethylglycine 2-(7-chloro-2,3-dihydro-2-oxo-5-phenyl-1H-1,4-benzodiazepin-1-yl)-2-methoxyethyl ester dihydrochloride which melts at 195–200° C. with decomposition.

EXAMPLE 4

A solution of 10.3 g. of 7-chloro-1,3-dihydro-1-[(2-hydroxy-1-methoxy)ethyl] - 5 - phenyl - 2H - 1,4-benzodiazepin-2-one in 125 ml. of pyridine is treated dropwise at 30°–35° C. with 10.4 g. of furan-2-carboxylic acid chloride. After completion of the addition, the mixture is stirred at room temperature for a further hour and then evaporated under reduced pressure. The residue is taken up in methylene chloride, the solution washed with water, dried over sodium sulphate and concentrated. The residual oil crystallizes on trituration with hexane and yields a crude product of melting point 126–129° C. On recrystallization from ethanol, there is obtained 2-(7-chloro-2,3-dihydro-2-oxo - 5 - phenyl-1H-1,4-benzodiazepin-1-yl)-2-methoxyethyl furan-2-carboxylate of melting point 129–131° C.

In analogy to the procedure set forth above, from 10.3 g. of 7-chloro-1,3-dihydro-1-[(2-hydroxy-1-methoxy)ethyl]-5-phenyl-2H-1,4-benzodiazepin-2-one and 11.6 g. of 5-methyl-isoxazole-3-carboxylic acid chloride there is obtained 2 - (7 - chloro-2,3-dihydro-2-oxo-5-phenyl-1H-1,4-benzodiazepin-1-yl)-2-methoxyethyl 5-methylisoxazole-3-carboxylate, melting point 145–147° C. after recrystallization from ethanol.

EXAMPLE 5

6.1 g. of isonicotinic acid are heated at 50°–55° C. for 1 hour with 60 ml. of thionyl chloride. The solution is concentrated, the residue slurried with benzene and again concentrated. The crude isonicotinoyl chloride hydrochloride thus obtained is added portionwise at 30–35° C. to a solution of 5.15 g. of 7-chloro-1,3-dihydro-1-[(2-hydroxy-1-methoxy)-ethyl] - 5-phenyl-2H-1,4-benzodiazepin-2-one in 75 ml. of pyridine and the mixture is stirred at room temperature for 1 hour. The precipitate is filtered off by suction and washed with methylene chloride. The filtrate is concentrated in a vacuum, the residue is partitioned between water and methylene chloride, the methylene chloride phase is dried over sodium sulphate and concentrated. The remaining oil crystallizes from ether and gives a crude product of melting point 174–178° C. Recrystallization from ethanol yields 2-(7-chloro-2,3-dihydro-2-oxo - 5 - phenyl-1H-1,4-benzodiazepin-1-yl)-2-methoxyethyl isonicotinate, melting point 177–179° C.

EXAMPLE 6

A suspension of 3.45 g. of 7-chloro-1,3-dihydro-1-[(2-hydroxy-1-methoxy)ethyl] - 5 - phenyl - 2H - 1,4-benzodiazepin-2-one in 50 ml. of benzene and 5 ml. of pyridine is treated with 2.5 ml. of nicotinoyl chloride and stirred at room temperature for 16 hours. After concentration in a vacuum, the residue is partitioned between water and methylene chloride, the organic phase washed with bicarbonate solution, dried over sodium sulphate and evaporated. The residual oil crystallizes from ether and, after recrystallization from ethyl acetate/hexane, gives 2-(7-chloro - 2,3 - dihydro-2-oxo - 5 - phenyl-1H-1,4-benzodiazepin-1-yl)-2-methoxyethyl nicotinate, melting point 138–140° C. After further recrystallization from ethyl acetate/hexane, the melting point rises to 140–142° C.

EXAMPLE 7

After the addition of 4.76 g. of picolinic acid, a slurry of 8.0 g. of N,N′-carbonyl-diimidazole in 40 ml. of tetrahydrofuran is stirred at room temperature under nitrogen for 2 hours, whereby there is obtained a clear solution of picolinic acid imidazolide. Meanwhile, a solution of imidazole-sodium is prepared from 0.16 g. of sodium and 1.6 g. of imidazole in 20 ml. of tetrahydrofuran by heating under reflux with exclusion of moisture and, after cooling to room temperature, is treated with a suspension of 8.1 g. of 7 - chloro - 1,3 - dihydro - 1 - [(2-hydroxy-1-methoxy)ethyl] - 5 - phenyl - 2H - 1,4 - benzodiazepin-2-one in 50 ml. of methylene chloride. The prepared solution of picolinic acid imidazolide is then added to this mixture at room temperature and the resulting mixture is stirred overnight. The precipitate is then filtered off and the filtrate evaporated in a vacuum. The oily residue is taken up in methylene chloride, the solution washed with sodium bicarbonate solution and water, dried over sodium sulphate and concentrated. The residual oil crystallizes on trituration with ether and, after recrystallization from ethanol/ether, yields 2-(7-chloro-2,3-dihydro-2-oxo-5-phenyl - 1H - 1,4 - benzodiazepin - 1 - yl) - 2 - methoxyethyl picolinate, melting point 151–153° C.

In analogy to the procedure set forth above, from 8.1 g. of 7 - chloro - 1,3 - dihydro - 1 - [(2-hydroxy-1-methoxy)ethyl] - 5 - phenyl - 2H - 1,4 - benzodiazepin-2-one and 5.8 g. of pyrazine-2-carboxylic acid there is obtained 2 - (7 - chloro - 2,3 - dihydro - 2 - oxo - 5 - phenyl - 1H - 1,4 - benzodiazepin - 1 - yl) - 2 - methoxyethyl pyrazine - 2 - carboxylate which melts at 113–116° C. with decomposition after recrystallization from methanol; from 8.1 g. of 7 - chloro - 1,3 - dihydro - 1 - [(2-hydroxy - 1 - methoxy) - ethyl] - 5 - phenyl - 2H - 1,4-benzodiazepin-2-one and 4.2 g. of methoxyacetic acid there is obtained an oily product which, after chromatography on 200 g. of silica gel with 20% ethyl acetate in methylene chloride and subsequent recrystallization from ether/hexane, gives 2 - (7 - chloro - 2,3 - dihydro-2-oxo - 5 - phenyl - 1H - 1,4 - benzodiazepin - 1 - yl)-2-methoxyethyl methoxyacetate, melting point 103–105° C.; from 8.1 g. of 7 - chloro - 1,3 - dihydro - 1 - [(2-hydroxy-1 - methoxy) - ethyl] - 5 - phenyl - 2H - 1,4 - benzodiazepin - 2 - one and 5.95 g. of 4 - methyl - 5 - oxazole-carboxylic acid there is obtained an oily product which is purified by chromatography on 200 g. of silica gel with a mixture of acetone/toluene/glacial acetic acid (50:50:1). After recrystallization from ethanol, the uniform fractions yield 2 - (7 - chloro - 2,3 - dihydro - 2 - oxo - 5 - phenyl - 1H - 1,4 - benzodiazepin - 1 - yl) - 2 - methoxyethyl 4 - methyl - oxazole - 5 - carboxylate of melting point 151–154° C. (decomposition); and from 8.1 g. of 7 - chloro - 1,3 - dihydro - 1 - [(2 - hydroxy - 1 - methoxy) - ethyl] - 5 - phenyl - 2H - 1,4 - benzodiazepin-2-one and 6.6 g. of 1,5-dimethyl-3-pyrazole-carboxylic acid there is obtained 2 - (7 - chloro - 2,3 - dihydro - 2 - oxo-5 - phenyl - 1H - 1,4 - benzodiazepin - 1 - yl) - 2 - methoxyethyl 1,5 - dimethyl - pyrazole - 3 - carboxylate which melts at 195–197° C. with decomposition after repeated recrystallization from ethanol.

EXAMPLE 8

A suspension of 3.45 g. of 7 - chloro - 1,3 - dihydro-1-[(2 - hydroxy - 1 - methoxy)ethyl] - 5 - phenyl - 2H - 1,4-benzodiazepin-2-one in 20 ml. of pyridine is treated dropwise at room temperature with 20 ml. of ethyl isocyanate and subsequently boiled at reflux for 2 hours. The clear solution is then concentrated to dryness under reduced pressure. The oily residue is dissolved in methylene chloride, washed with 5% potassium carbonate solution and with saturated sodium chloride solution, dried over sodium sulphate and evaporated. The residual oil crystallizes on trituration with hexane and, after recrystallization from ether/hexane, gives 2 - (7 - chloro-2,3-dihydro-2-oxo-5-phenyl - 1H - 1,4 - benzodiazepin - 1 - yl) - 2 - methoxyethyl ethylcarbamate of melting point 117–119° C.

In analogy to the procedure set forth above, from 3.45 g. of 7 - chloro - 1,3 - dihydro - 1 - [(2 - hydroxy-1-methoxy)ethyl] - 5 - phenyl - 2H - 1,4 - benzodiazepin-2-one and 20 ml. of methyl isocyanate there is obtained 2 - (7 - chloro - 2,3 - dihydro - 2 - oxo - 5 - phenyl-1H-1,4 - benzodiazepin - 1 - yl) - 2 - methoxyethyl methyl carbamate which melts at 134–136° C. after recrystallization from ether/hexane.

EXAMPLE 9

A suspension of 10.3 g. of 7 - chloro - 1,3 - dihydro-1-[(2 - hydroxy - 1 - methoxy)ethyl] - 5 - phenyl - 2H - 1,4-benzodiazepin - 2 - one in 150 ml. of benzene and 15 ml. of pyridine is treated with 11 g. of dichloroacetyl chloride and stirred at room temperature for 6 hours. After concentration in a vacuum, the residue is taken up in methylene chloride, chromatographed on 450 g. of silica gel with 20% ethyl acetate in methylene chloride and recrystallized from ether/hexane to yield 2 - (7 - chloro-2,3 - dihydro - 2 - oxo - 5 - phenyl - 1H - 1,4-benzodiazepin-1-yl)-2-methoxyethyl dichloroacetate, melting point 116°–118° C.

EXAMPLE 10

In an analogous manner to that described in Example 2, from 5.3 g. of 1,3 - dihydro - 1 - [(2 - hydroxy-1-methoxy)ethyl] - 7 - nitro - 5 - phenyl - 2H - 1,4 - benzodiazepin-2-one, 2.85 g. of chloroacetic acid anhydride and 3.0 ml. of triethylamine, after chromatography on silica gel with 20% ethyl acetate in methylene chloride and recrystallization from methylene chloride/ether, there is obtained 2 - (2,3 - dihydro - 7 - nitro - 2 - oxo - 5 - phenyl-1H - 1,4 - benzodiazepin - 1 - yl) - 2 - methoxyethyl chloroacetate of melting point 117°–121° C. (decomposition).

The starting material may be prepared as follows:

A suspension of 28.1 g. of 1,3-dihydro-7-nitro-5-phenyl-2H-1,4-benzodiazepin-2-one in 200 ml. of methanol is treated at room temperature with 6.7 g. of potassium hydroxide (in flakes). The clear solution obtained is concentrated to dryness and the residual salt dissolved in 150 ml. of dimethylformamide. The mixture is cooled to −40° C., 19.5 g. of 1,2-dichloro-1-methoxyethane are added dropwise and the mixture is stirred at −40° C. for 5 minutes. Within 30 minutes, the temperature is allowed to raise to 0° C., the mixture is poured with stirring onto 500 ml. of water, the precipitated product is filtered off by suction and taken up in methylene chloride. After drying over sodium sulphate, the methylene chloride solution is evaporated and the residue crystallized from ether to yield 1-[(2 - chloro-1-methoxy)ethyl]-1,3-dihydro-7-nitro-5-phenyl-2H-1,4-benzodiazepin-2-one, melting point 162°–164° C.

A solution of 10 g. of 1-[(2-chloro-1-methoxy)ethyl]-1,3-dihydro - 7 - nitro-5-phenyl-2H-1,4-benzodiazepin-2-one in 100 ml. of dimethylformamide is treated with 10 g. of potassium acetate and heated to 110° C. for 1 hour. After cooling to room temperature, the mixture is poured onto 800 ml. of water. The precipitate is separated off and taken up in methylene chloride. The solution is washed with water, dried over sodium sulphate and chromatographed on 600 g. of silica gel first with 20% ethyl acetate in methylene chloride and then with ethyl acetate alone. The uniform fractions eluted with ethyl acetate yield, after recrystallization from ethanol with a small amount of active charcoal, 1,3-dihydro-1-[(2-hydroxy-1-methoxy)ethyl]-7-nitro - 5 - phenyl-2H-1,4-benzodiazepin-2-one of melting point 201°–203° C.

EXAMPLE 11

In the same manner as described in Example 7, from 9.13 g. of 7-bromo-1,3-dihydro-1-[(2-hydroxy-1-methoxy)ethyl]-5-(2-pyridyl)-2H-1,4-benzodiazepin-2-one and 5.76 g. of nicotinic acid there is obtained 2-[7-bromo-2,3-dihydro-2-oxo-5-(2-pyridyl) - 1H - 1,4-benzodiazepin-1-yl]-2-methoxyethyl nicotinate which melts at 147°–150° C. with decomposition after recrystallization from isopropanol.

The starting material may be prepared as follows:

A suspension of 31.4 g. of 7-bromo-1,3-dihydro-5-(2-pyridyl)-2H-1,4-benzodiazepin-2-one in 200 ml. of methanol is treated at room temperature with 6.7 g. of potassium hydroxide (in flakes). 150 ml. of dimethylformamide are then added (there resulting a clear solution)

and the methanol is thereupon removed under reduced pressure. The mixture is then cooled to −40° C., 19.5 g. of 1,2-dichloro-1-methoxyethane are added dropwise and the mixture is stirred at −40° C for 5 minutes. The temperature is allow to rise to 0° C. by itself and the mixture is poured onto 500 ml. of water. The precipitated product is filtered off by suction, taken up in methylene chloride and, after drying over sodium sulphate, evaporated. The residue is chromatographed on 850 g. of silica gel with 20% ethyl acetate in methylene chloride. After recrystallization from ethanol, the homogeneous fractions yield 7-bromo - 1 - [(2-chloro-1-methoxy)-ethyl]-1,3-dihydro-5-(2-pyridyl)-2H-1,4-benzodiazepin-2-one, melting point 149°–151° C. (decomposition).

A solution of 20.4 g. of 7-bromo-1-[(2-chloro-1-methoxy)ethyl]-1,3-dihydro-5-(2-pyridyl) - 2H - 1,4-benzodiazepin-2-one in a mixture of 200 ml. of dimethylformamide and 10 ml. of water is treated with 8 g. of potassium acetate and boiled under reflux for 5 minutes. After cooling to 0° C., the mixture is poured onto 800 ml. of water. The precipitated product is separated off and taken up in methylene chloride. The solution, after washing with water and drying over sodium sulphate, is evaporated and the residue crystallized from ether. After recrystallization from ethanol, there is obtained 7-bromo-1,3-dihydro-1-[(2-hydroxy-1-methoxy)ethyl] - 5 - (2-pyridyl)-2H-1,4-benzodiazepin-2-one, melting point 198°–200° C. (decomposition).

EXAMPLE 12

In an analogous manner to that described in Example 1, from 2.7 g. of 7-chloro-1,3-dihydro-1-[(2-hydroxy-1-methoxy)ethyl]-5-phenyl-2H-1,4 - benzodiazepin-2-one 4-oxide, 1.0 g. of succinic acid anhydride and 1.5 ml. of triethylamine in 25 ml. of benzene there is obtained a crude product of melting point 188°–190° C. Crystallization from methylene chloride/ether yields pure 2-(7-chloro-2,3dihydro-2-oxo-5-phenyl-1H-1,4-benzodiazepin - 1 - yl)-2-methoxyethyl hydrogen succinate 4-oxide of melting point 191°–192° C.

The starting material may be prepared as follows:

A stirred suspension of 13.8 g. of 7-chloro-1,3-dihydro-1-[(2-hydroxy-1-methoxy)ethyl] - 5 - phenyl-2H-1,4-benzodiazepin-2-one in 100 ml. of methylene chloride is treated at room temperature with 7.8 ml. of trimethylchlorosilane. There is formed a clear solution which is further stirred for 5 minutes. 8.4 ml. of triethylamine are thereupon added dropwise within 15 minutes. The mixture is stirred at room temperature for a further 30 minutes, the precipitated triethylamine hydrochloride is filtered off by suction, the filtrate is washed with ice-cooled water and dried over sodium sulphate. After concentration, the oily residue is triturated with hexane, whereby crystallization occurs. After recrystallization from acetonitrile, there is obtained 7-chloro-1,3-dihydro-1-[1-methoxy-2-(trimethylsiloxy)ethyl]-5-phenyl-2H - 1,4 - benzodiazepin-2-one, melting point 104°–106° C.

A solution of 8.3 g. of 7-chloro-1,3-dihydro-1-[1-methoxy-2-(trimethylsiloxy)ethyl] - 5-phenyl-2H-1,4-benzodiazepin-2-one in 10 ml. of methylene chloride is treated at room temperature with 5.6 g. of m-chloroperbenzoic acid and stirred for 4 hours. The precipitated m-chlorobenzoic acid is filtered off by suction and the filtrate washed with 10% sodium carbonate and water. The methylene chloride solution is dried over sodium sulphate, filtered and evaporated. The residual oil (10 g.) is dissolved in 20 ml. of methanol, treated with 4 ml. of water and left to stand at room temperature for 1 hour. The crystals are filtered off by suction and washed with ethanol and ether. After recrystallization from ethanol, there is obtained 7-chloro-1,3-dihydro-1-[(2-hydroxy-1-methoxy)ethyl] - 5 - phenyl-2H-1,4-benzodiazepin-2-one 4-oxide, melting point 210°–212° C.

EXAMPLE 13

A stirred solution of 4.4 g. of 2-(7-chloro-2,3-dihydro-2 - oxo - 5-phenyl-1H-1,4-benzodiazepin-1-yl)-2-methoxyethyl hydrogen succinate in 30 ml. of methylene chloride is treated at room temperature with 2.8 g. of m-chloroperbenzoic acid. The mixture is stirred for 4 hours and left to stand overnight. After concentration, the oily residue is triturated with ether, whereby crystallization occurs. Recrystallization from methylene chloride/ether yields pure 2-(7-chloro-2,3-dihydro-2-oxo-5-phenyl-1H-1,4-benzodiazepin-1-yl)-2-methoxyethyl hydrogen succinate 4-oxide of melting point 191°–192° C.

EXAMPLE 14

A solution of 2.25 g. of 2-(7-chloro-2,3-dihydro-2-oxo-5 - phenyl - 1H - 1,4 - benzodiazepin-1-yl)-2-methoxyethyl-5-methylisoxazole-3-carboxylate in 15 ml. of methylene chloride is treated at room temperature with 1.4 g. of m-chloroperbenzoic acid. The mixture is stirred for 2 hours and left to stand overnight. The precipitated m-chlorobenzoic acid is filtered off by suction and the filtrate washed with 10% sodium carbonate solution and water. The methylene chloride solution is dried over sodium sulphate, filtered and concentrated. The residual oil crystallizes from ether and gives a crude product of melting point 199°–202° C. Recrystallization from methylene chloride/ether gives pure 2-(7-chloro-2,3-dihydro-2-oxo-5 - phenyl - 1H - 1,4-benzodiazepin-1-yl)-2-methoxyethyl 5-methyl-isoxazole-3-carboxylate 4-oxide, melting point 210°–211° C.

EXAMPLE 15

A solution of 10.9 g. of 7 - chloro - 1 - [(2-chloro-1-methoxy)ethyl] - 1,3 - dihydro - 5 - phenyl - 2H - 1,4-benzodiazepine - 2 - one, 4.9 g. of nicotinic acid and 4.0 g. triethylamine in 100 ml. of absolute dimethylformamide is boiled at reflux for 1 hour under a nitrogen atmosphere and with exclusion of moisture. The solvent is removed in a vacuum at 70° C. and the residue dissolved in a mixture of 200 ml. of ethyl acetate and 100 ml. of water. The ethyl acetate phase is separated off, washed twice with 100 ml. of ice-cold 5% sodium bicarbonate solution each time and twice with 100 ml. of water each time, dried over magnesium sulphate and evaporated in a vacuum. The residue is disolved in 30 ml. of ethyl acetate and chromatographed on 200 g. of silica gel. The column is eluted with ethyl acetate. The uniform fractions, containing 2-(7-chloro-2,3-dihydro-2-oxo-5-phenyl-1H - 1,4 - benzodiazepin-1-yl)-2-methoxyethyl nicotinate, are combined and evaporated in a vacuum. After recrystallization from ethyl acetate/petroleum ether, the residue yields 2 - (7 - chloro - 2,3-dihydro-2-oxo-5-phenyl-1H-1,4-benzodiazepin-1-yl)-2-methoxyethyl nicotinate, melting point 141°–142° C. A second crystal modification melts at 166°–167° C.

EXAMPLE 16

A solution of 9.9 g. of 7-chloro-1-[(2-chloro-1-methoxy)ethyl] - 5 - (o - fluorophenyl)-1,3-dihydro-2H-1,4-benzodiazepin-2-one, 4.9 g. of nicotinic acid and 4.0 g. of triethylamine in 100 ml. of absolute dimethylformamide is boiled at reflux for 1 hour under a nitrogen atmosphere and with exclusion of moisture. The solvent is removed in a vacuum at 70° C. and the residue dissolved in a mixture of 400 ml. of ethyl acetate and 250 ml. of water. The ethyl acetate phase is separated off, washed twice with 100 ml. of ice-cold 5% sodium bicarbonate solution each time and twice with 100 ml. of water each time, dried over magnesium sulphate and evaporated to dryness in a vacuum. The residue is dissolved in 30 ml. of ethyl acetate and chromatographed on 160 g. of silica gel. The column is eluted with ethyl acetate. The uniform fractions, containing 2-[7-chloro-5-(o-fluorophenyl)-2,3-dihydro - 2 - oxo-1H-1,4-benzodiazepin-1-yl]-2-methoxyethyl nicotinate, are combined and evaporated in a vacuum. The residue is recrystallized from alcohol and then melts at 81°–83° C. The alcohol-containing crystalline product is melted, the melt is heated at 140° C. for 3 hours and, after cooling, triturated with 50 ml. of ether. After filtration by suction and drying, there is obtained 2 - [(7 - chloro - 5-(o-fluorophenyl)-2,3-dihydro - 2 - oxo-1H-1,4-benzodiazepin-1-yl]-2-methoxyethyl nicotinate of melting point 155°–156° C.

The starting material may be prepared as follows: 7-chloro - 1 - [(2 - chloro-1-methoxy)ethyl]-5-(o-fluorophenyl) - 1,3 - dihydro - 2H-1,4-benzodiazepin-2-one is obtained according to the procedure described for the preparation of the starting material in Example 1 from 14.4 g. of 7-chloro-5-(o-fluorophenyl)-1,3-dihydro-2H-1,4-benzodiazepin-2-one and 9.7 g. of 1,2-dichloro-1-methoxyethane. It has a melting point of 170°–172° C. after crystallization from acetonitrile.

EXAMPLE 17

A solution of 14.5 g. of 7-chloro-1-(2-chloro-1-methoxyethyl) - 1,3-dihydro-5-phenyl-2H-1,4-benzodiazepin-2-one, 6.4 g. of thiophene-2-carboxylic acid and 5.1 g. of triethylamine in 100 ml. of absolute dimethylformamide is boiled at reflux for 1 hour under a nitrogen atmosphere and with exclusion of moisture and subsequently evaporated in a vacuum at 70° C. The residue is dissolved in a mixture of 500 ml. of ethyl acetate and 250 ml. of water. The ethyl acetate phase is separated off, washed twice with 100 ml. of ice-cold 5% sodium bicarbonate solution each time and twice with 200 ml. of water each time, dried over magnesium sulphate, boiled up with 1 g. of active charcoal and, after filtration, evaporated in a vacuum. Recrystallization of the residue from alcohol yields 2 - (7 - chloro-2,3-dihydro-2-oxo-5-phenyl-1H-1,4-benzodiazepin-1-yl)-2-methoxyethyl thiophene - 2-carboxylate, melting point 134°–135° C.

EXAMPLE 18

A solution of 18.2 g. of 7-chloro-1-(2-chloro-1-methoxyethyl)-1,3-dihydro-5-phenyl-2H-1,4 - benzodiazepin-2-one, 7.2 g. of formylglycine and 7.1 g. of triethylamine in 200 ml. of absolute dimethylformamide is boiled at reflux for 1 hour under a nitrogen atmosphere and with exclusion of moisture. The solvent is removed in a vacuum at 70° C. and the residue dissolved in a mixture of 500 ml. of ethyl acetate and 150 ml. of water. The ethyl acetate phase is separated off, washed twice with 150 ml. of ice-cold 5% sodium bicarbonate solution each time and twice with 250 ml. of water each time, dried over magnesium sulphate and evaporated in a vacuum. The residue is dissolved in 50 ml. of ethyl acetate and chromatographed on 400 g. of silica gel. The column is eluted with ethyl acetate. The uniform fractions, containing 2-(7-chloro - 2,3 - dihydro - 2 - oxo-5-phenyl-1H-1,4-benzodiazepin-1-yl)-2-methoxyethyl formylglycinate, are combined and evaporated to dryness in a vacuum. Recrystallization from ethyl acetate/petroleum ether gives 2-(7-chloro-2,3-dihydro-2-oxo - 5 - phenyl-1H-1,4-benzodiazepin-1-yl)-2-methoxyethyl formylglycinate, melting point 110°–112° C.

A solution of 16.0 g. of 2-(7-chloro-2,3-dihydro-2-oxo-5 - phenyl-1H-1,4-benzodiazepin-1-yl) - 2 - methoxyethyl formyl glycinate in 500 ml. of 2-M methanolic hydrochloric acid is stirred at 25° C. for 4.5 hours and subsequently evaporated to dryness in a vacuum. The residue is taken up in 200 ml. of water and the undissolved material removed by extraction with 400 ml. of ethyl acetate. The ethyl acetate phase is again washed with 100 ml. of water and discarded. The aqueous fractions are combined, adjusted to pH=8–9 with 5% sodium bicarbonate solution with the addition of ice and extracted twice with 300 ml. of ethyl acetate each time. The ethyl acetate solution is washed twice with 200 ml. of water each time, dried over magnesium sulphate and evaporated to dryness in a vacuum. The residue is recrystallized from ether/cyclohexane to yield 2-(7-chloro-2,3-dihydro-2-oxo-5-phenyl-1H-1,4-benzodiazepin-1-yl) - 2 - methoxyethyl glycinate, melting point 115°–116° C.

EXAMPLE 19

A solution of 500 mg. of 2-(7-chloro-2,3-dihydro-2-oxo-5-phenyl - 1H - 1,4 - benzodiazepin-1-yl)-2-methoxyethyl hydrogen succinate 4-oxide in 5 ml. of chloroform is treated with 0.35 ml. of phosphorus trichloride and the mixture is boiled at reflux for 2 hours. The mixture is then poured onto ice, the organic phase is separated off and washed with water. The solution is dried over sodium sulphate, evaporated to dryness and the residue is triturated with ether whereby crystallization occurs. Recrystallization from acetone yields pure 2-(7-chloro-2,3-dihydro-2-oxo - 5 - phenyl-1H-1,4-benzodiazepin-1-yl)-2-methoxyethyl hydrogen succinate of melting point 167°–169° C.

EXAMPLE 20

Tablets of the following composition are manufactured:

| | Per tablet, mg. |
|---|---|
| 2 - (7 - chloro - 2,3 - dihydro-2-oxo-5-phenyl-1H-1,4-benzodiazepin-1-yl)-2-methoxyethyl nicotinate | 10 |
| Corn starch | 53 |
| Lactose | 150 |
| Gelatin (10% solution) | 6 |

The active ingredient (benzodiazepine derivative), the corn starch and the lactose are thickened with a 10% gelatin solution. The paste is comminuted, the granulate brought into a suitable pan and dried at 43° C. The dried granulate is passed through a comminuting machine, mixed in a mixer with the following ingredients:

| | Mg. |
|---|---|
| Talc | 6 |
| Magnesium stearate | 6 |
| Corn starch | 9 | and then compressed to tablets weighing 240 mg.

EXAMPLE 21

Suppositories containing the following ingredients are manufactured:

| | Per 1.3 g. Suppository, mg. |
|---|---|
| 2-(7 - chloro-2,3-dihydro-2-oxo-5-phenyl-1H-1,4-benzodiazepin-1-yl)-2-methoxyethyl nicotinate | 10.0 |
| Hydrogenated coconut oil | 1245.0 |
| Carnauba wax | 45.0 |

The hydrogenated coconut oil and the carnauba wax are melted in a suitable vessel fitted with a glass liner and cooled to 45° C. The active ingredient (benzodiazepine derivative) is added with stirring and stirred until completely dispersed. The mixture is then poured into suppository moulds which ensure a suppository weight of 1.3 g.

EXAMPLE 22

A parenteral administration form containing the following ingredients is manufactured:

| | Per ml. |
|---|---|
| 2 - (7 - chloro - 2,3 - dihydro-2-oxo-5-phenyl-1H-1,4-benzodiazepin - 1 - yl) - 2 - methoxyethyl nicotinate mg | 5 |
| Dimethylacetamide percent | 10 |
| Benzyl alcohol do | 1.5 |
| Ethanol do | 10 |
| Water for injection add 1 ml. | |

The active ingredient (benzodiazepine derivative) is dissolved in dimethylacetamide and treated with benzyl alcohol, ethanol and water. The solution is filtered through a candle filter and filled into suitable ampoules which are sealed and sterilized.

EXAMPLE 23

Tablets, suppositories or parenteral administration forms are manufactured according to Examples 20–22 using as the active ingredient one of the following benzodiazepine derivatives:

2-(7-chloro-2,3-dihydro-2-oxo-5-phenyl-1H-1,4-benzodiazepin-1-yl)-2-methoxyethyl picolinate,
2-(7-chloro-2,3-dihydro-2-oxo-5-phenyl-1H-1,4-benzodiazepin-1-yl)-2-methoxyethyl pyrazine-2-carboxylate,
2-(7-chloro-2,3-dihydro-2-oxo-5-phenyl-1H-1,4-benzodiazepin-1-yl)-2-methoxyethyl chloroacetate,
2-(7-chloro-2,3-dihydro-2-oxo-5-phenyl-1H-1,4-benzodiazepin-1-yl)-2-methoxyethyl hydrogen succinate,
2-(7-chloro-2,3-dihydro-2-oxo-5-phenyl-1H-1,4-benzodiazepin-1-yl)-2-methoxyethyl methoxyacetate,
2-(7-chloro-2,3-dihydro-2-oxo-5-phenyl-1H-1,4-benzodiazepin-1yl)-2-methoxyethyl ethylcarbamate or
2-(7-chloro-2,3-dihydro-2-oxo-5-phenyl-1H-1,4-benzodiazepin-1-yl)-2-methoxyethyl methylcarbamate.

We claim:

1. A compound selected from the group consisting of a compound of the formula

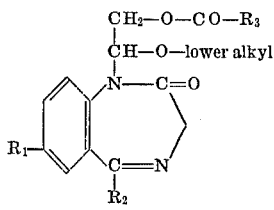

a compound of the formula

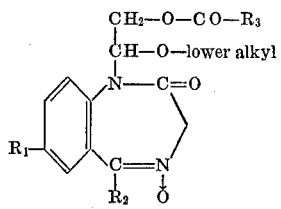

and pharmaceutically acceptable acid addition salts thereof wherein $R_1$ signifies halogen or nitro; $R_2$ signifies phenyl, halophenyl or pyridyl; $R_3$ signifies halo-lower alkyl, lower alkoxy-lower alkyl, carboxy-lower alkyl, mono-lower alkylamino, di-lower alkylamino, a 5- or 6-membered aromatic heterocyclic ring selected from the group consisting of furyl, thienyl, oxazolyl, isoxazolyl, pyrazolyl, pyridyl and pyridazinyl which may be substituted with one or two lower alkyl groups, or the group

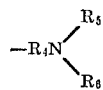

in which $R_4$ signifies a lower alkylene group and $R_5$ and $R_6$ individually represent hydrogen or lower alkyl or $R_5$ and $R_6$ taken together with their attached nitrogen atom form a 5- or 6-membered saturated heterocyclic ring selected from the group consisting of 1-pyrrolidinyl, piperidino and morpholino.

2. A compound of claim 1 wherein $R_1$ signifies chlorine or nitro.

3. A compound of claim 1 wherein $R_2$ is selected from the group consisting of phenyl, 2-halophenyl and 2-pyridyl.

4. A compound of claim 3 wherein the 2-halophenyl group is a 2-chlorophenyl or 2-fluorophenyl group.

5. A compound of claim 1 wherein $R_3$ signifies a 5- or 6-membered aromatic heterocyclic ring selected from the group consisting of furyl, thienyl, oxazolyl, isoxazolyl, pyrazolyl, pyridyl, and pyridazinyl which may be substituted with one or two lower alkyl groups.

6. A compound of claim 5 wherein the aromatic heterocyclic ring is selected from the group consisting of 3-pyridyl, 2-pyridyl and 2-pyrazinyl.

7. A compound of claim 1 wherein $R_3$ is selected from the group consisting of halo-methyl, carboxy-lower alkyl, lower alkoxy-lower alkyl, or lower alkylamino.

8. A compound of claim 7 wherein $R_3$ is selected from the group consisting of chloromethyl, 2-carboxyethyl, methoxymethyl, methylamino or ethylamino.

9. 2-(7 - chloro - 2,3 - dihydro-2-oxo-5-phenyl-1H-1,4-benzodiazepin-1-yl)-2-methoxyethyl nicotinate.

10. 2-(7-chloro - 2,3 - dihydro-2-oxo-5-phenyl-1H-1,4-benzodiazepin-1-yl)-2-methoxyethyl picolinate.

11. 2-(7-chloro-2,3-dihydro - 2 - oxo-5-phenyl-1H-1,4-benzodiazepin-1-yl) - 2 - methoxyethyl pyrazine - 2 - carboxylate.

12. 2-(7-chloro-2,3 - dihydro - 2 - oxo - 5 - phenyl-1H-1,4-benzodiazepin-1-yl)-2-methoxyethyl chloroacetate.

13. 2-(7-chloro - 2,3 - dihydro-2-oxo-5-phenyl-1H-1,4-benzodiazepin-1-yl)-2-methoxyethyl hydrogen succinate.

14. 2-(7-chloro-2,3-dihydro - 2 - oxo-5-phenyl-1H,1,4-benzodiazepin-1-yl)-2-methoxyethyl methoxyacetate.

15. 2-(7-chloro-2,3-dihydro-2-oxo - 5 - phenyl-1H-1,4-benzodiazepin-1-yl)-2-methoxyethyl ethylcarbamate.

16. 2-(7-chloro - 2,3 - dihydro-2-oxo-5-phenyl-1H-1,4-benzodiazepin-1-yl)-2-methoxyethyl methylcarbamate.

References Cited
UNITED STATES PATENTS
3,391,138    7/1968    Archer et al. ____ 260—239.3 D HENRY R. JILES, Primary Examiner
R. J. BOND, Assistant Examiner U.S. Cl. X.R.
260—326.3 247.2 B, 293.69, 250 A, 485 R, 484 R, 487, 482 R; 424—285, 275, 272, 250, 263, 273; 260—347.5, 332.2 C, 307, 310 R, 295.5 R, 295 R; 424—244